United States Patent
Horie et al.

(10) Patent No.: US 6,572,503 B2
(45) Date of Patent: Jun. 3, 2003

(54) ROCKER JOINT SILENT CHAIN

(75) Inventors: Hiroshi Horie, Osaka (JP); Kazumasa Matsuno, Osaka (JP); Shigekazu Fukuda, Osaka (JP); Takayuki Funamoto, Osaka (JP); Yoshinori Iwasaki, Osaka (JP); Makoto Kanehira, Osaka (JP); Hitoshi Ohara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/939,176

(22) Filed: Aug. 24, 2001

(65) Prior Publication Data

US 2002/0025867 A1 Feb. 28, 2002

(30) Foreign Application Priority Data

Aug. 24, 2000 (JP) ........................................ 2000-254107

(51) Int. Cl.[7] ............................................... F16G 13/00
(52) U.S. Cl. ........................ 474/213; 474/215; 474/212
(58) Field of Search ................................ 474/212–217, 474/230, 231, 206, 229, 226, 228; 59/5

(56) References Cited

U.S. PATENT DOCUMENTS

| | | | | |
|---|---|---|---|---|
| 5,176,586 A | * | 1/1993 | Sugimoto ................ 474/212 |
| 5,372,554 A | * | 12/1994 | Okuda ..................... 474/215 |
| 5,419,743 A | * | 5/1995 | Takeda et al. ............ 474/215 |
| 5,941,059 A | * | 8/1999 | Kanehira et al. ......... 474/214 |
| 6,406,394 B1 | * | 6/2002 | Bubel et al. .............. 474/212 |

FOREIGN PATENT DOCUMENTS

| JP | 62-132052 A | * | 6/1987 | ............... 474/212 |
|---|---|---|---|---|
| JP | 2000-352445 A | * | 12/2000 | |

* cited by examiner

Primary Examiner—Marcus Charles
(74) Attorney, Agent, or Firm—Howson & Howson

(57) ABSTRACT

A rocker joint silent chain includes rocker joints articulately connecting together multiple interleaved link plates and guide plates located outside the interleaved link plates in the widthwise direction of the chain. Each of the rocker joints is composed of a longer pin firmly fitted at opposite ends thereof in a pair of aligned pin-accommodation holes of two opposed guide plates, and a shorter pin having opposite ends projecting from opposite outer surfaces of the interleaved link plates. The ends of the shorter pin are in slight contact with inner surfaces of the guide plates. High-frequency noise and abrasive wear of the rocker joints and link plates, which may occur due to free movement of the shorter pin in the widthwise direction of the chain, can be avoided.

2 Claims, 4 Drawing Sheets

ROCKER JOINT SILENT CHAIN

BACKGROUND OF THE INVENTION

1. Field of the Invention

The present invention relates generally to a rocker joint silent chain suitable for use in an automobile as a power transmission chain.

2. Description of the Related Art

A rocker joint silent chain used in an automobile is wound around more than two sprockets for transmitting power between the sprockets.

The rocker joint silent chain includes, as shown here in FIGS. 8 and 9, a multiplicity of sets of link plates A articulately connected together in an interleaved fashion by rocker joints C, with guide plates B located outside the set of link plates in the lateral direction for being guided on and along opposite end faces of the sprocket. Each set of link plates A is composed of a plurality of link plates A arranged in a row in the widthwise direction of the chain. Each link plate A has a pair of bifurcated engagement teeth A1, A1 spaced in a direction of travel of the chain for mesh with teeth of each sprocket (not shown), and a pair of pin-accommodation holes A2 spaced in the direction of travel of the chain. The guide plates B each have a pair of pin-accommodation holes B1 spaced in the direction of travel of the chain.

Each of the rocker joints C is composed of a cooperating pair of rocker joint pins C1 and C2 of different lengths. The longer rocker joint pin C1 and the shorter rocker joint pin C2 (hereinafter referred to, for brevity, as "longer pin" and "shorter pin", respectively) are inserted in pair through each of the pin-accommodation holes A2 of the link plates A. The longer pin C2 is firmly fitted in each pin-accommodation hole B1 of the guide plates B and fixedly secured at its opposite ends to the guide plates B. The longer pin C1 and the shorter pin C2, which are used in combination, have respective convexly arcuate front surfaces held in contact with each other for rolling motion of the longer and shorter pins C1, C2 to permit the interleaved link plates A to pivot.

As best shown in FIG. 10, in the conventional rocker joint silent chain, each end of the shorter pin C2 is spaced a distance from the inside surfaces of a corresponding one of the guide plates B. Due to the presence of the clearance or gap G, the conventional rocker joint silent chain has a drawback, as described below.

In general, in a chain power transmission device composed of a power transmitting chain and two or more sprockets, the chain is likely to become loose or slack at its return side generally called "slack side" because the chain tension at the slack side is extremely smaller than the chain tension at a stretched side generally called "tension side" of the chain. This may cause flattering or resonant vibration of the chain especially when the sprockets are rotating at speeds below a operational speed range. In such instance, the chain travels in an advancing direction at irregular speeds while vibrating in vertical and horizontal directions.

In the case where the power transmitting chain consists of the afore-mentioned conventional rocker joint silent chain, wherein a clearance G is provided between each end of the shorter pin C2 and the inside surface of the corresponding guide plate B, as shown in FIG. 10, since the shorter pin C2 inserted through the pin-accommodating holes A2 (FIG. 8) of the link plates A is allowed to move freely within the range of the clearance G, the shorter pin C2 generates high-frequency contact noise or impact sound due to repeated contact with the inside surface of the pin-accommodation hole A2 and the convexly arcuate front surface of the longer pin C1.

The high-frequency contact noise or the impact sound is added to a meshing sound produced when the teeth of the chain come in mesh with the sprocket teeth with the result that the overall transmission noise level of the chain power transmission device increases greatly. In addition, the inside surface of the pin-accommodation hole A2 and the front surface of the longer pin C1 suffer from abrasive wear caused due to free movement of the shorter pin C2. This may hinder smooth mutual articulate movement of the link plates and shorten the service life of the chain.

To deal with this problem, an attempt may be made, in which a stopper member is provided to prevent the shorter pin C2 from moving freely. The stopper member, however, not only increases the number of parts used in the chain and the overall weight of the chain, but also makes the chain complicated in construction. This may cause additional difficulties in the manufacture and handling of the chain.

SUMMARY OF THE INVENTION

It is accordingly a general object of the present invention to overcome the problems caused due to free movement of shorter pins of the conventional rocker joint silent chain.

A more specific object of the present invention is to provide a rocker joint silent chain which is capable of preventing generation of high-frequency noise resulting from free movement of a shorter pin of each rocker joint, without increasing the number of parts of the silent chains thereby lowering the overall transmission noise level of the chain greatly, enabling smooth articulate movement of the interleaved link plates, and providing a prolonged service life of the chain.

To achieve the foregoing objects, according to the present invention, there is provided a rocker joint silent chain comprising: a plurality of sets of link plates interleaved with other sets of link plates, each link plate having a pair of spaced engagement teeth and a pair of spaced pin-accommodation holes; a plurality of pairs of guide plates located outside the sets of link plates in the widthwise direction of the silent chain, each guide plate having a pair of spaced pin-accommodation holes; and a plurality of rocker joints inserted in the pin-accommodation holes of the link plates and the pin-accommodation holes of the guide plates to connect the interleaved sets of link plates and the guide plates in an endless fashion. Each of the rocker joints is composed of a longer pin and a shorter pin which is smaller in length than the longer pin. The longer pin has opposite ends firmly fitted in a pair of aligned pin-accommodation holes of each pair of guide plates. The shorter pin has opposite ends projecting from opposite outer surfaces of each set of interleaved link plates and being in slight contact with inner surfaces of the pair of guide plates.

In one preferred form of the present invention, each end of the shorter pin has a flat end face, and the inner surface of each of the guide plates comprises a flat inner surface. The flat end face of the shorter pin and the flat inner surface of each guide plate are in surface contract with each other.

In another preferred form of the present invention, each end of the shorter pin has a flat end face, and each of the guide plates has a tongue-like stopper bent toward the flat end face of the shorter pin. The tongue-like stopper is in point contact with the flat end face of the shorter pin. The tongue-like stopper is integral with the guide plate and formed by cutting a portion of the guide plate adjacent each of the pair of pin-accommodating holes of the guide plate.

The term "is in slight contact with" used herein means that the opposite end surfaces of the shorter pin and the inner surfaces of the guide plate are not in pressure contact with each other but in light contact with each other to such an extent that the contact resistance between the end faces of the shorter pin and the inner surface of the guide plate can be neglected.

Since the opposite ends of the longer pin are firmly fitted in the pin-accommodation holes of the guide plates and thus secured to the guide plates, the width of the silent chain can be maintained uniformly, and a set of link plats which is offset half a pitch from the longer pin is permitted to pivot as the shorter pin rolls used in combination with the longer pin rolls on the longer pin.

Since the opposite ends of the shorter pin project from opposite outer surfaces of the set of interleaved link plates and are in slight contact with the inner surfaces of the guide plates located outside the link plate set, even when the silent chain is traveling in an advancing direction while vibrating in vertical and horizontal directions due to flattering or resonant vibration occurring at low operating speed range of the sprockets under the conditions that the chain tension is extremely small at the slack side of the silent chain and the chain is likely to become slack, free movement of the shorter pin inside the pin-accommodation holes of the interleaved link plates is completely prevented. This assists smooth pivotal movement of the interleaved link plates.

BRIEF DESCRIPTION OF THE DRAWINGS

Preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
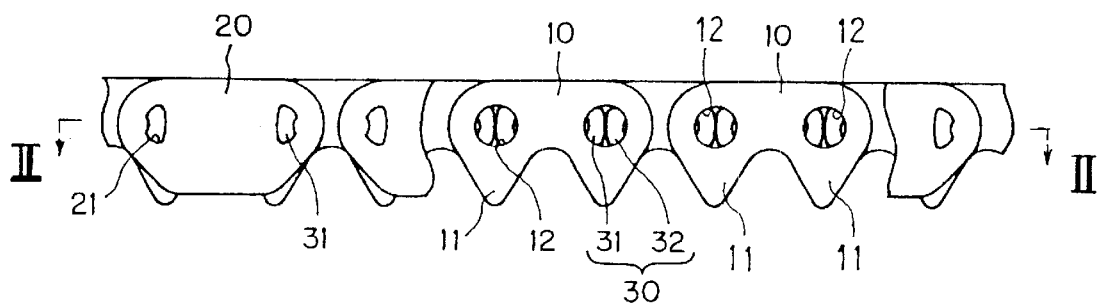
FIG. 1 is a fragmentary side view, with parts broken away for clarity, of a rocker joint silent chain according to a first embodiment of the present invention.
Figure 2:
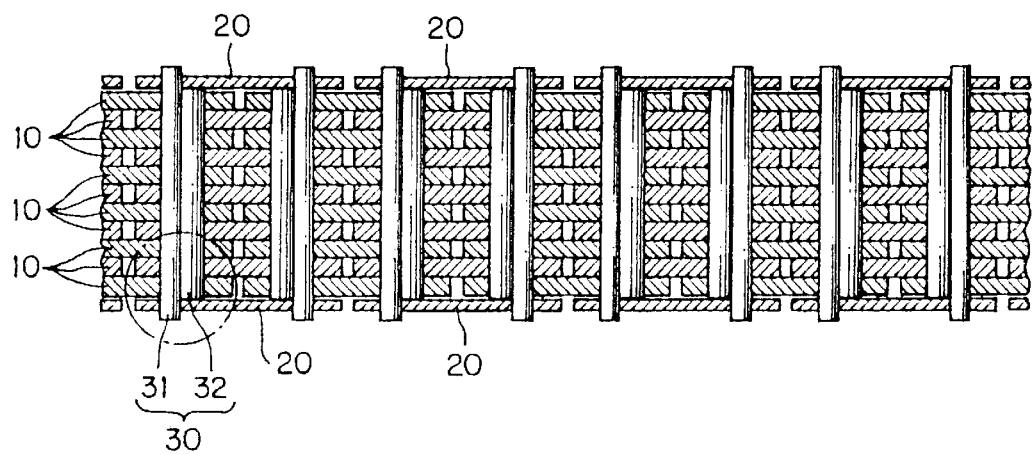
FIG. 2 is a cross-sectional view taken along line II—II of FIG. 1.
Figure 3:
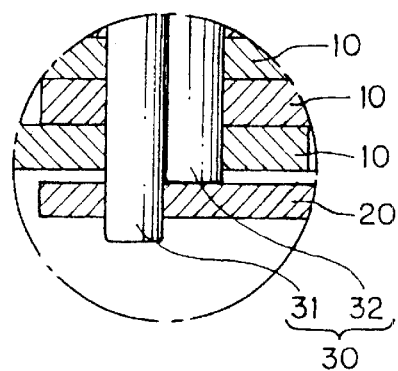
FIG. 3 is an enlarged view of a portion of FIG. 2.
Figure 4:
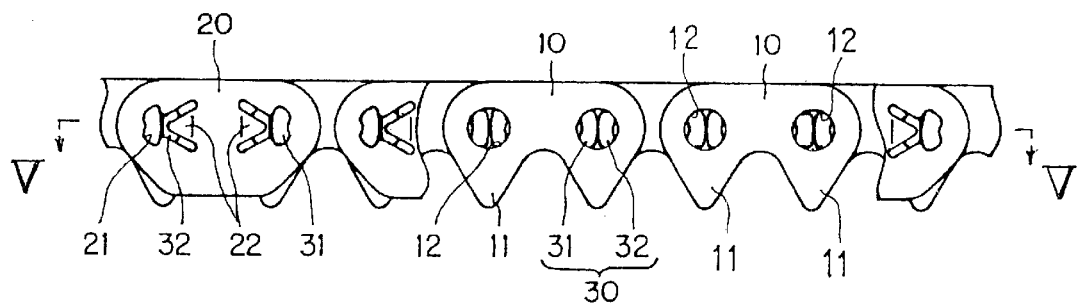
FIG. 4 is a fragmentary side view, with parts broken away for clarity, of a rocker joint silent chain according to a second embodiment of the present invention.
Figure 5:
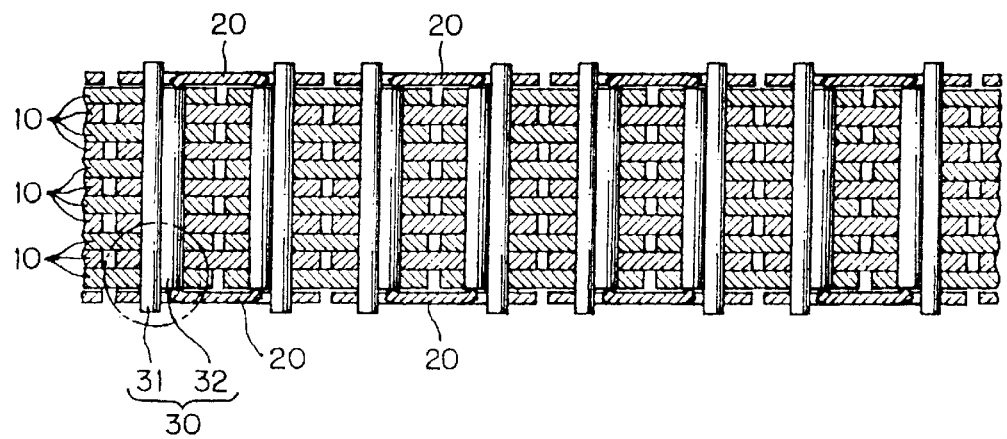
FIG. 5 is a cross-sectional view taken along line V—V of FIG. 4.
Figure 6:
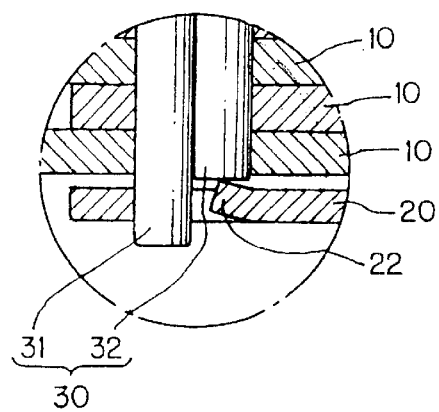
FIG. 6 is an enlarged view of a portion of FIG. 5.

Referring now to the drawings and FIGS. 1 to 3 in particular, there is shown a rocker joint silent chain according to a first embodiment of the present invention. The rocker joint silent chain includes a plurality of sets of link plates 10 interleaved with other sets of link plates 10, guide plates 20 located outside the row of link plates 10 in the lateral direction, and rocker joints 30 connecting the interleaved sets of link plates 10 and the guide plates 20 in an endless fashion. Though not shown, the rocker joint silent chain is wound around two or more sprockets for transmitting power between the sprockets.

The link plates 10 each have a pair of engagement teeth 11 and 11 for mesh with teeth of the sprockets, and a pair of pin-accommodation holes 12 and 12 through which a pair of rocker joints 30 is inserted, respectively. Both the engagement teeth 11 and the pin-accommodation holes 12 are spaced in a longitudinal direction of the silent chain. The guide plates 20 each have a pair of pin-accommodation holes 21 spaced in the longitudinal direction of the silent chain. The guide plates 20 disposed on opposite outer sides of the interleaved sets of link plates 10 are guided on and along opposite end faces of the sprocket teeth, not shown.

The rocker joints 30 act as the connecting pin which connects multiple laminated link plates 10. Each of the rocker joints 30 is composed of two pins 31, 32 of different lengths and has a convexly arcuate front surface (rocker surface). The longer rocker joint pin 31 and the shorter rocker joint pin 32 (hereinafter referred to, for brevity, as "longer pin 31" and "Shorter pin 32", respectively) are inserted through each pin-accommodating hole 12 with the respective rocker surfaces contacting each other, so that the link plates 10 connected in the longitudinal direction of the silent chain are permitted to bend or flex smoothly. In the illustrated embodiment, the longer pin 31 and the shorter pin 32 are formed by cutting or severing a continuous metal wire into predetermined individual lengths after the metal wire is formed by drawing or pulling through a die. Thus, the longer pin 31 and the shorter pin 32 are identical in cross section and have the same thickness. The respective rocker surfaces of the longer and shorter pins 31, 31 have the same radius of curvature. The longer pin 31 and the shorter pin 32 may have different cross-sectional shapes and thicknesses. The rocker surface of the longer pin 31 may have a different radius of curvature from the rocker surface of the shorter pin 32.

Both ends of the longer pin 31 are firmly fitted in the pin-accommodation holes 21 of the opposed guide plates 20 and thus secured to the guide plates 20. With the longer pin 31 thus secured at opposite ends to the guide plates 20, the width of the silent chain can be maintained uniformly, and a set of link plats 10 which is offset half a pitch from the longer pin 31 in the longitudinal direction of the chain is permitted to pivot as the shorter pin 32 rolls on the longer pin 31.

Each end of the shorter pin 32, as shown on enlarged scale in FIG. 3, projects from an outer surface of the endmost link plate 10 in one link plate set and is in slight contact with an inner surface of the corresponding guide plate 20 located outside the endmost link plate 10. The end of the shorter pin 32 has a flat end face, and the inner surface of the guide plate 20 is a flat surface. The flat end face of the shorter pin 32 and the flat inner surface of the guide plate 32 are in surface contact with each other.

The end of the shorter pin 32 and the inner surfaces of the guide plate 20 are not in pressure contact with each other but in light contact with each other to such an extent that the contact resistance between the end of the shorter pin 32 and the inner surface of the guide plate 20 can be neglected. With this arrangement, even when the silent chain is traveling in an advancing direction while vibrating in vertical and horizontal directions due to flattering or resonant vibration occurring at low operating speed range of the sprockets under the conditions that the chain tension is extremely small at the slack side of the silent chain and the chain is likely to become slack, the shorter pin 32 is completely prevented from moving freely in the widthwise direction of the silent chain as it is received inside the pin-accommodating holes 12 of the laterally aligned link plates 10. This assists smooth pivotal movement of the interleaved link plates 10.

The length of the shorter pin 32 is slightly larger than the distance between a pair of guide plates 20 confronting in the widthwise direction of the silent chain (i.e., in the axial direction of the rocker joint 30).

The rocker joint silent chain of the foregoing construction is able to prevent generation of high-frequency noise resulting from the shorter pins 32 of the rocker joints 30 to thereby providing considerable reduction of the overall transmission noise level of the chain, without requiring any additional component, such as a stopper member or a cushion member. Thus, the rocker joint silent chain or the present invention does not increase the number of parts used, ensures smooth pivotal movement of the interleaved link plates 10, and can prolong the service life of the silent chain.

FIGS. 4 to 7 are views similar to FIGS. 1 to 3, respectively, but showing a rocker joint silent chain according to a second embodiment of the present invention. These parts which are like or corresponding to those shown in FIGS. 1 to 3 are designated by the same reference characters, and further description thereof can be omitted.

The rocker joint silent chain in the second embodiment differs from the rocker joint silent chain in the first embodiment shown in FIGS. 1–3 in that each guide plate 20 has a tongue-like stopper 22 slightly bent inward from the guide plate 20 for point contact with an end face of the shorter pin 32.

Figure 7:
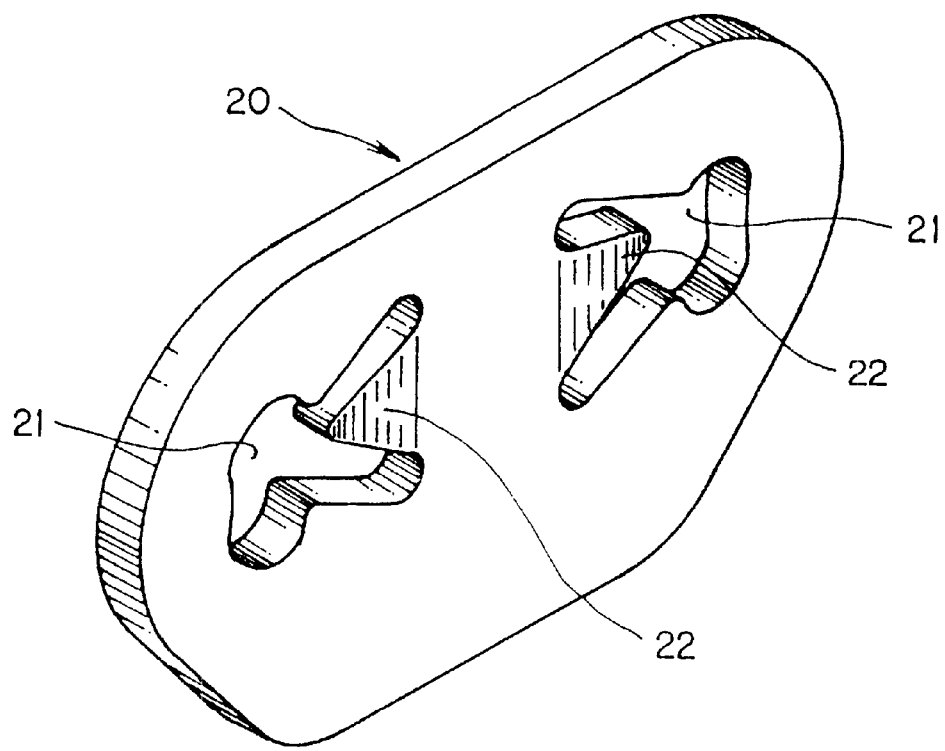
FIG. 7 is an enlarged perspective view of a guide plate of the silent chain shown in FIG. 4.
Figure 8:
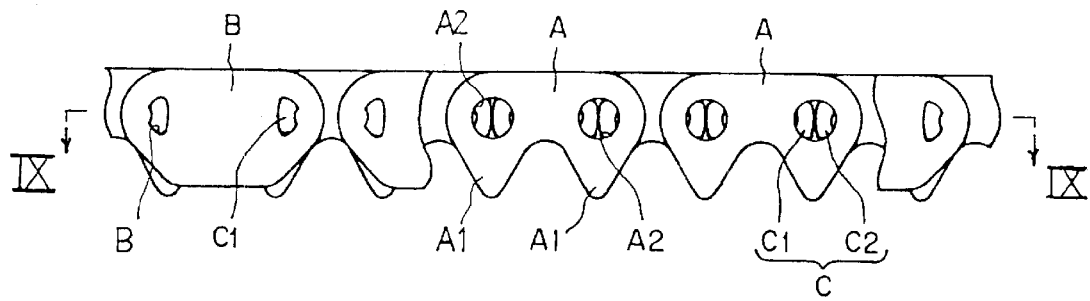
FIG. 8 is a fragmentary side view, with parts broken away for clarity, of a conventional rocker joint silent chain.
Figure 9:
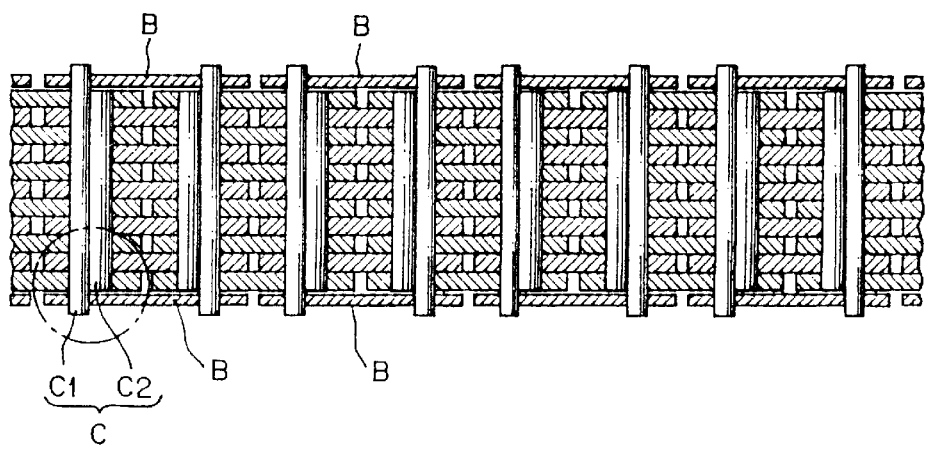
FIG. 9 is a cross-sectional view taken along line IX—IX of FIG. 8.
Figure 10:
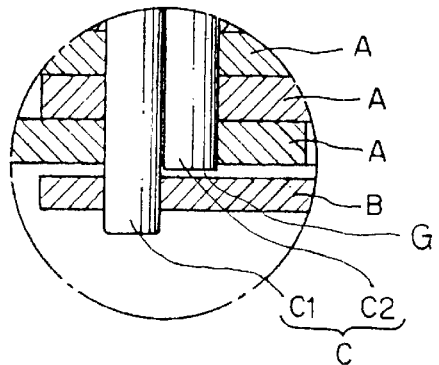
FIG. 10 is an enlarged view of a portion of FIG. 9.

As shown in FIG. 7, the tongue-like stopper 22 is formed by cutting a portion of the guide plate 20 adjacent the pin-accommodation hole 21 and is slightly bent at an acute angle toward one side of the guide plate 20.

In an assembled condition of the rocker joint silent chain, a tip end of the tongue-like stopper 22 is in point contact with an end face of the shorter pin 32 projecting slightly from the outer surface of an endmost link plate 10 in the widthwise direction of the silent chain. By virtue of the tongue-like stoppers 22, the shorter pin 32 received in the pin-accommodation hole 21 is held in position against movement in the widthwise direction of the chain. There is a clearance provided between an outer surface of the interleaved link plates 10 and an inner surface of the guide plate 20, so that no contact resistance is produced between the interleaved link plates 10 and the guide plate 20. The point contact between the tongue-like stopper 22 and the end face of the shorter pin 32 and the clearance provided between the interleaved link plates 10 and the guide plate 20 secure extremely smooth pivotal movement of the interleaved link plates 10 provide a further reduction of the noise.

Additionally, since the tongue-like stopper 22 is formed integrally with the guide plate 20, free movement of the shorter pin 32 can be prevented without providing a separate part, which increase the number of parts of the silent chain and may lower the power transmission efficiency of the silent chain.

As described above, the rocker joints 30 according to the present invention are each composed of a longer pin 31 firmly fitted at opposite ends in a pair of aligned pin-accommodation holes 21 of the opposite guide plates 20, and a shorter pin 32 having opposite ends projecting slightly from opposite outer surfaces of a set of interleaved link plates 10 and being in slight contact with inner surfaces of the opposite guide plates 20. With this arrangement, various advantageous effects can be attained, as enumerated below.

(1) At the slack side of the silent chain, where flattering or resonant vibration of the chain is likely to occur at low rotational speeds of the sprockets, free movement of the shorter pins 32 inside the pin-accommodation holes 21 is completely prevented. Accordingly, high-frequency noise resulting from free movement of the shorter pins 32 does not occur and, hence, the overall transmission noise level of the chain can be reduced greatly.

(2) Since free movement of the shorter pins 32 inside the pin-accommodation holes 21 is completely prevented, it is possible to avoid abrasive ware which would otherwise occur on the inside surface of the pin-accommodation holes 21 and an outside surface of the longer pins 31 due to free movement of the shorter pins 32. This ensures smooth pivotal movement of the interleaved link plates 10 and provides a prolonged service life of the silent chain.

(3) By virtue of the shorter pin 32 having opposite ends projecting from opposite outer surfaces of a set of interleaved link plates 10 and being in slight contact with inner surfaces of two opposed guide plates 20, a considerable reduction of noise can be achieved by a simple construction without requiring a separate additional component, such as a stopper member or a cushion member for preventing free movement of the shorter pins 32, which leads to an increase in both the number of parts of the silent chain and the weight of the silent chain, and a reduction of the power transmission efficiency of the silent chain.

Obviously, various minor changes and modifications of the present invention are possible in the light of the above teaching. It is therefore to be understood that within the scope of the appended claims, the present invention may be practiced otherwise than as specifically described.

What is claimed is:

1. A rocker joint silent chain comprising:
   a plurality of sets of link plates interleaved with other sets of link plates, each link plate having a pair of spaced engagement teeth and a pair of spaced pin-accommodation holes;
   a plurality of pairs of guide plates located outside the sets of link plates in the widthwise direction of the silent chain, each guide plate having a pair of spaced pin-accommodation holes; and
   a plurality of rocker joints inserted in the pin-accommodation holes of the link plates and the pin-accommodation holes of the guide plates to connect the interleaved sets of link plates and the guide plates in an endless fashion;
   each of the rocker joints being composed of a longer pin and a shorter pin, the longer pin having opposite ends firmly fitted in a pair of aligned pin-accommodation holes of each pair of guide plates, and the shorter pin having opposite ends projecting from opposite outer surfaces of each set of interleaved link plates and being in contact with inner surfaces of the pair of guide plates
   wherein each end of the shorter pin has a flat end face, and each of the guide plates has a stopper bent toward the flat end face of the shorter pin, the stopper being in point contact with the flat end face of the shorter pin.

2. A rocker joint silent chain according to claim 1, wherein the stopper is integral with the guide plate and formed by cutting a portion of the guide plate adjacent each of the pair of pin-accommodating holes of the guide plate.

* * * * *